(12) United States Patent
Lewis

(10) Patent No.: US 11,535,193 B2
(45) Date of Patent: Dec. 27, 2022

(54) VEHICLE SEATBELT USAGE INDICATING DEVICE

(71) Applicant: Jimmie Lewis, Prattville, AL (US)

(72) Inventor: Jimmie Lewis, Prattville, AL (US)

( * ) Notice: Subject to any disclaimer, the term of this patent is extended or adjusted under 35 U.S.C. 154(b) by 45 days.

(21) Appl. No.: 17/173,696

(22) Filed: Feb. 11, 2021

(65) Prior Publication Data

US 2022/0250581 A1 Aug. 11, 2022

(51) Int. Cl.
*B60R 22/48* (2006.01)
*B60Q 1/00* (2006.01)
*B60Q 1/26* (2006.01)
*B60Q 1/50* (2006.01)

(52) U.S. Cl.
CPC ............ *B60R 22/48* (2013.01); *B60Q 1/0035* (2013.01); *B60Q 1/2607* (2013.01); *B60Q 1/2669* (2013.01); *B60Q 1/2696* (2013.01); *B60Q 1/50* (2013.01); *B60R 2022/4816* (2013.01); *B60R 2022/4875* (2013.01)

(58) Field of Classification Search
CPC .... B60R 22/48; B60Q 1/0035; B60Q 1/2607; B60Q 1/2669; B60Q 1/2696; B60Q 1/50
See application file for complete search history.

(56) References Cited

U.S. PATENT DOCUMENTS

| | | | | |
|---|---|---|---|---|
| 6,059,066 A * | 5/2000 | Lary | ......................... | B60R 22/48 340/457.1 |
| 6,774,781 B1 * | 8/2004 | Lee | .......................... | B60R 22/48 340/468 |
| 7,271,712 B2 | 9/2007 | Rubel | | |
| 7,528,709 B1 | 5/2009 | Maggiora | | |
| 7,812,716 B1 * | 10/2010 | Cotter | ..................... | B60R 22/48 340/468 |
| 10,112,528 B1 * | 10/2018 | Mazuir | .................... | B60Q 1/28 |
| 10,173,639 B1 | 1/2019 | Baumann | | |
| 2003/0098194 A1 * | 5/2003 | Roddy | ..................... | B60R 22/48 180/270 |
| 2005/0156726 A1 * | 7/2005 | Rubel | ............... | B60R 21/01546 340/457.1 |
| 2008/0225547 A1 * | 9/2008 | Rogers | ..................... | F21S 43/14 362/548 |
| 2009/0096624 A1 | 4/2009 | Stengel | | |
| 2009/0299577 A1 | 12/2009 | Demant | | |

(Continued)

FOREIGN PATENT DOCUMENTS

| CA | 2492006 | 1/2005 |
|---|---|---|
| WO | WO2015150604 | 10/2015 |

*Primary Examiner* — Bryon T Gyllstrom

(57) ABSTRACT

A vehicle seatbelt usage indicating device for indicating, to a person proximate to the vehicle, proper usage of a seatbelt includes a light emitter, which can be affixed to an exterior surface of a door of a vehicle. The light emitter is engageable to an electronic control unit of the vehicle so that the light emitter is operationally engaged thereto. The electronic control unit is positioned to receive a signal from a sensor engaged to a buckle of a seatbelt, which is integral to a seat positioned adjacent to the door of the vehicle. The sensor is positioned to detect insertion of a latch into the buckle. The electronic control unit is positioned to selectively actuate the light emitter to indicate, upon insertion of the latch into the buckle, proper usage of the seatbelt to a person proximate to the vehicle.

9 Claims, 3 Drawing Sheets

(56) References Cited

U.S. PATENT DOCUMENTS

| | | | |
|---|---|---|---|
| 2012/0105218 A1* | 5/2012 | Scanapico | B60R 22/48 |
| | | | 340/425.5 |
| 2012/0242477 A1 | 9/2012 | Rosenblatt | |
| 2016/0059777 A1* | 3/2016 | Malone | B60K 35/00 |
| | | | 340/426.1 |
| 2017/0072903 A1 | 3/2017 | Farshchi | |
| 2017/0088041 A1* | 3/2017 | Johnson | B60R 22/48 |
| 2019/0139411 A1* | 5/2019 | Dhull | B60Q 1/525 |
| 2020/0148161 A1* | 5/2020 | Jaradi | B60R 22/48 |

* cited by examiner

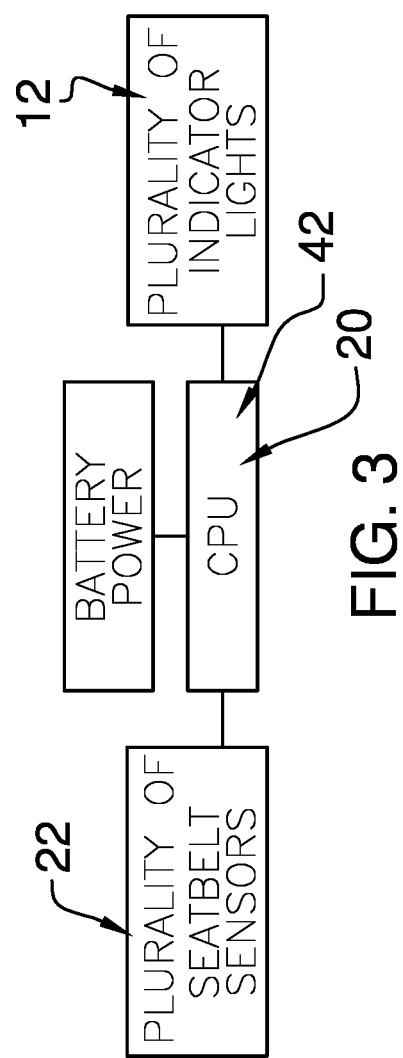

VEHICLE SEATBELT USAGE INDICATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to indicating device and more particularly pertains to a new indicating device for indicating, to a person proximate to the vehicle, proper usage of a seatbelt. The present invention discloses an indicating device comprising a light emitter configured to be engageable to an exterior surface of a door of a vehicle and to be operationally engageable an electronic control unit of the vehicle.

(2) Description of Related Art Including Information Disclosed Under 37 CFR 1.97 and 1.98

The prior art relates to indicating devices, and in particular indicating devices that indicate, to a person proximate to the vehicle, proper usage of a seatbelt. Prior art indicating devices may comprise switches or sensors engaged to seatbelts for detecting fastening thereof, audio alarms, and visual indicators positioned vehicles, typically on rear ends thereof. What is lacking in the prior art is an indicating device comprising a light emitter configured to be engageable to an exterior surface of a door of a vehicle and to be operationally engageable an electronic control unit of the vehicle.

BRIEF SUMMARY OF THE INVENTION

An embodiment of the disclosure meets the needs presented above by generally comprising a light emitter, which is configured to be engageable to an exterior surface of a door of a vehicle so that the light emitter is affixed thereto. The light emitter also is configured to engage an electronic control unit of the vehicle so that the light emitter is operationally engaged thereto. The electronic control unit is positioned to receive a signal from a sensor engaged to a buckle of a seatbelt, which is integral to a seat positioned adjacent to the door of the vehicle. The sensor is positioned to detect insertion of a latch into the buckle. The electronic control unit is positioned to selectively actuate the light emitter to indicate, upon insertion of the latch into the buckle, proper usage of the seatbelt to a person proximate to the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a block diagram of an embodiment of the disclosure.

DETAILED DESCRIPTION OF THE INVENTION

Figure 1:
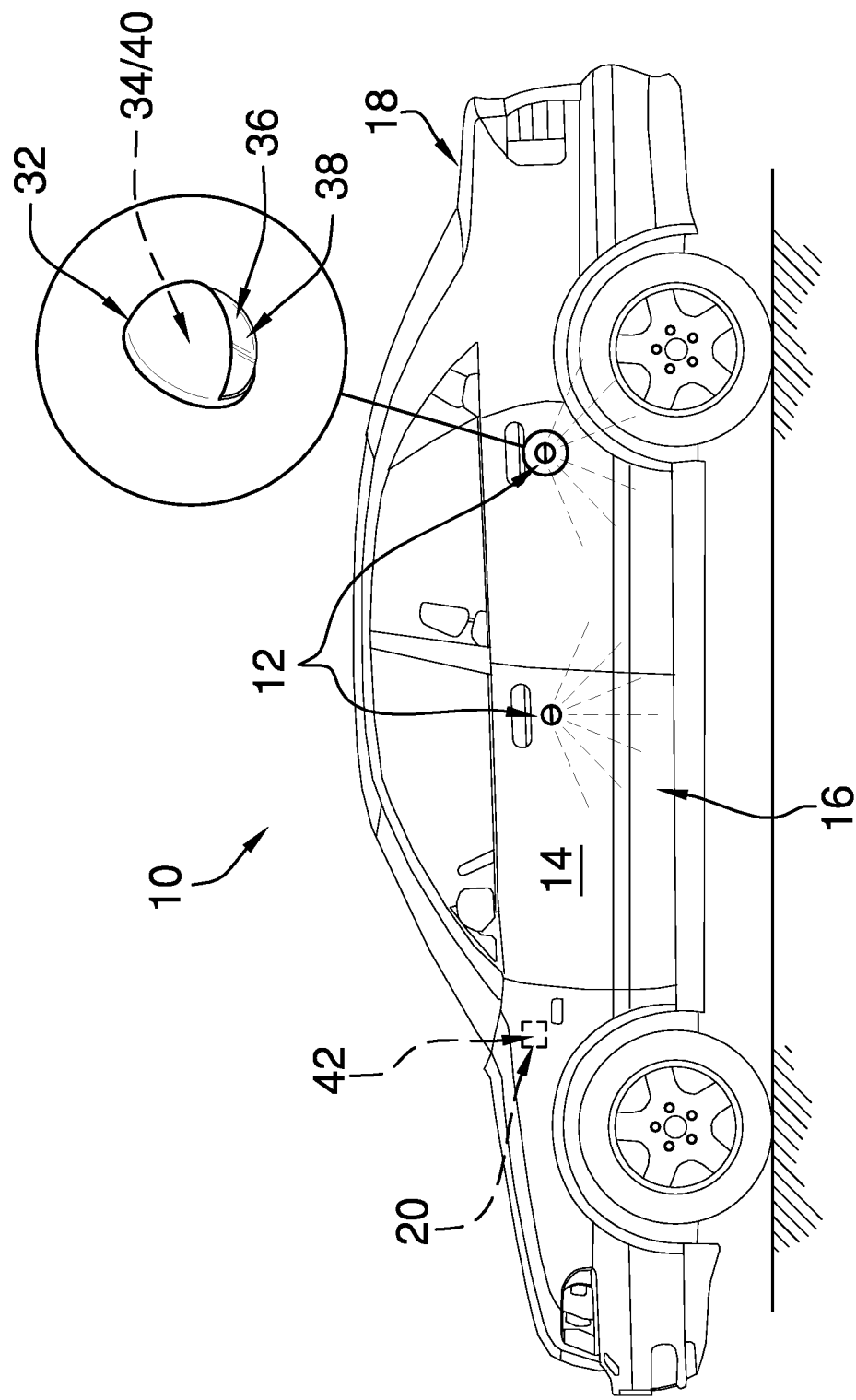
FIG. 1 is a side in-use view of a vehicle seatbelt usage indicating device according to an embodiment of the disclosure.
Figure 2:
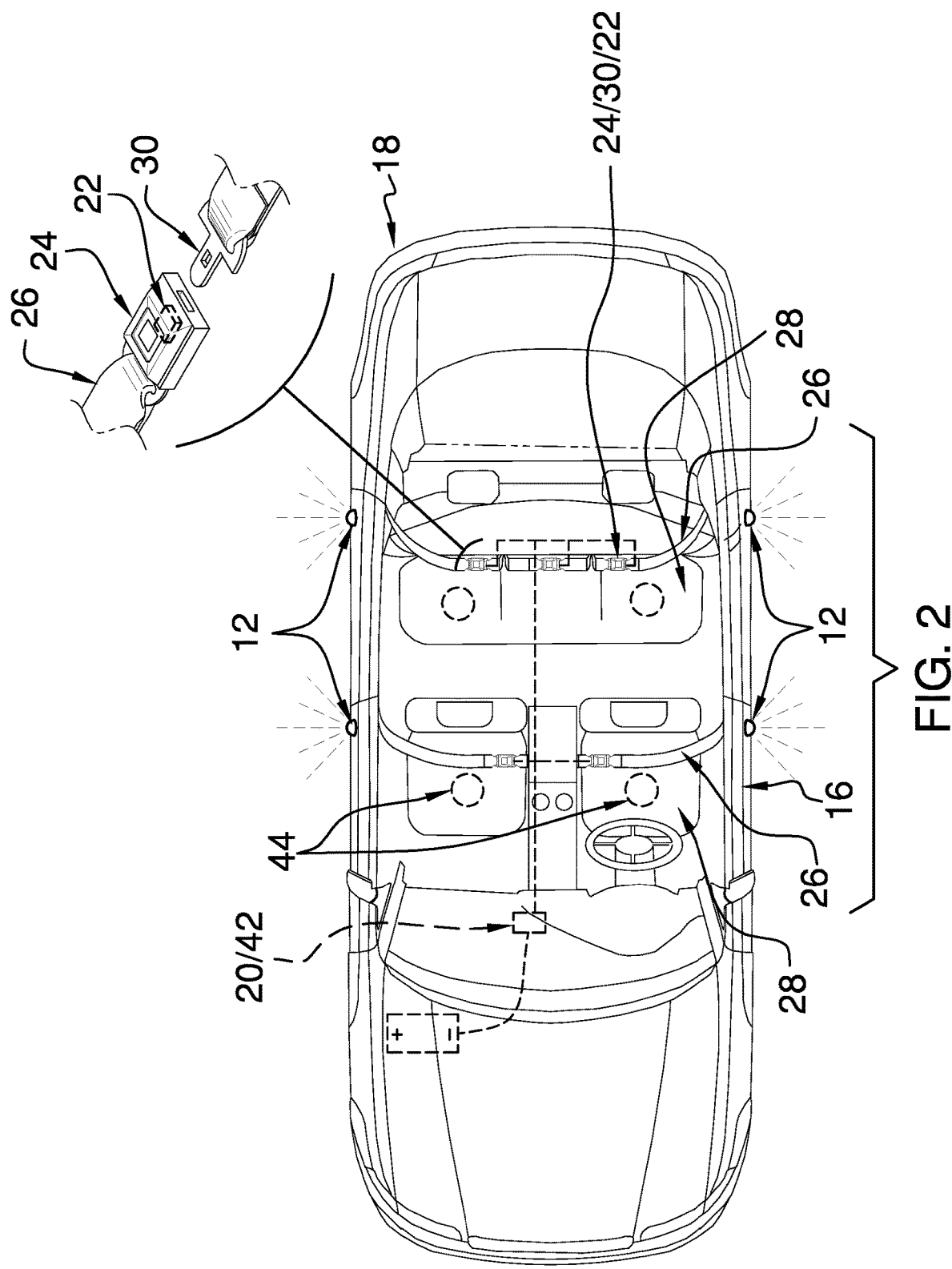
FIG. 2 is a top in-use view of an embodiment of the disclosure.

With reference now to the drawings, and in particular to FIGS. 1 through 3 thereof, a new indicating device embodying the principles and concepts of an embodiment of the disclosure and generally designated by the reference numeral 10 will be described.

As best illustrated in FIGS. 1 through 3, the vehicle seatbelt usage indicating device 10 generally comprises a light emitter 12, which is configured to be engageable to an exterior surface 14 of a door 16 of a vehicle 18 so that the light emitter 12 is affixed thereto. The light emitter 12 also is configured to engage an electronic control unit 20 of the vehicle 18 so that the light emitter 12 is operationally engaged thereto.

The electronic control unit 20 is positioned to receive a signal from a sensor 22 engaged to a buckle 24 of a seatbelt 26, which is integral to a seat 28 positioned adjacent to the door 16 of the vehicle 18. The sensor 22 is positioned to detect insertion of a latch 30 into the buckle 24. The electronic control unit 20 is positioned to selectively actuate the light emitter 12 to indicate, upon insertion of the latch 30 into the buckle 24, proper usage of the seatbelt 26 to a person proximate to the vehicle 18. The present invention is anticipated to be useful in providing a visual indicator of usage of the seatbelt 26 to law enforcement officials, parents, and guardians.

The light emitter 12 comprises a housing 32, which has a bulb 34 engaged thereto and positioned therein. At least a portion 36 of the housing 32 is substantially transparent so that light emitted by the bulb 34 passes therethrough. The housing 32 may be substantially hemispherically shaped, as shown in FIG. 1, or alternatively shaped, such as, but not limited to, half ovoid shaped, cuboid shaped, and the like.

As shown in FIG. 1, the portion 36 of the housing 32 that is substantially transparent may comprise a lower quadrant 38 of the housing 32. The bulb 34 may comprise a light emitting diode 40. For example, the bulb 34 may comprise red, yellow, and green light emitting diodes 40, which are selectively actuatable by the electronic control unit 20.

As shown in FIGS. 1 and 2, the light emitter 12 comprises a set of light emitters 12. Each light emitter 12 is affixable to a respective door 16 of the vehicle 18 so that each door 16 has a light emitter 12 affixed thereto. The present invention anticipates the set of light emitters 12 being integral to the vehicle 18 by incorporating the set of light emitters 12 into manufacturing of the vehicle 18.

The present invention also anticipates programming code 42 positioned on the electronic control unit 20 of the vehicle 18. The programming code 42 would enable the electronic control unit 20 to selectively actuate the light emitter 12 based on readings from seat occupancy detectors 44, which are integral to seats 28 of the vehicle 18.

The programming code 42 also could enable the electronic control unit 20 to selectively actuate the light emitter 12 in a variety of modes of illumination. For example, the electronic control unit 20 could selectively actuate the light emitter 12 to produce red light with improper usage of the seatbelt 26, green light with proper usage of the seatbelt 26, and yellow light when the seat 28 is unoccupied. The electronic control unit 20 also could selectively actuate the light emitter 12 to intermittently illuminate, or flash, with improper usage of the seatbelt 26.

In use, the sensor 22 engaged to the buckle 24 detects insertion of the latch 30 to assess proper usage of the seatbelt 26. A signal to the electronic control unit 20 positions it to actuate the light emitter 12 to signal to law enforcement officials, parents, guardians, and the like, that the seatbelt 26 is being used.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle seatbelt usage indicating device comprising a light emitter configured to be engageable to an exterior surface of a door of a vehicle, such that the light emitter is affixed thereto, the light emitter being configured for engaging an electronic control unit of the vehicle, such that the light emitter is operationally engaged thereto, such that the electronic control unit is positioned for receiving a signal from a sensor engaged to a buckle of a seatbelt integral to a seat adjacent to the door of the vehicle, such that the sensor is positioned for detecting insertion of a latch into the buckle, such that the electronic control unit is positioned for selectively actuating the light emitter upon insertion of the latch into the buckle for indicating, to a person proximate to the vehicle, proper usage of the seatbelt wherein the light emitter comprises a housing having a bulb engaged thereto and positioned therein, at least a portion of the housing being substantially transparent, such that light emitted by the bulb passes therethrough, wherein the housing is substantially hemispherically shaped.

2. The vehicle seatbelt usage indicating device of claim 1, wherein the portion of the housing comprises a lower quadrant thereof.

3. The vehicle seatbelt usage indicating device of claim 1, wherein the bulb comprises a light emitting diode.

4. The vehicle seatbelt usage indicating device of claim 1, wherein the light emitter comprises a set of light emitters, each light emitter being affixable to a respective door of the vehicle, such that each door has a light emitter affixed thereto.

5. A vehicle seatbelt usage indicating system comprising:
a vehicle comprising a door and an electronic control unit;
a seatbelt integral to a seat adjacent to the door;
a sensor engaged to a buckle of the seatbelt, such that the sensor is positioned for detecting insertion of a latch into the buckle, the sensor being operationally engaged to the electronic control unit, such that the electronic control unit is positioned for receiving a signal from the sensor;
a light emitter affixed to an exterior surface of the door, the light emitter being operationally engaged to the electronic control unit, such that the electronic control unit is positioned for selectively actuating the light emitter upon insertion of the latch into the buckle for indicating, to a person proximate to the vehicle, proper usage of the seatbelt;
wherein the light emitter comprises a housing having a bulb engaged thereto and positioned therein, at least a portion of the housing being substantially transparent, such that light emitted by the bulb passes therethrough; and
wherein the housing is substantially hemispherical shaped.

6. The vehicle seatbelt usage indicating system of claim 5, wherein the portion of the housing comprises a lower quadrant thereof.

7. The vehicle seatbelt usage indicating system of claim 5, wherein the bulb comprises a light emitting diode.

8. The vehicle seatbelt usage indicating system of claim 5, wherein the light emitter comprises a set of light emitters, each light emitter being affixed to a respective door of the vehicle, such that each door has a light emitter affixed thereto.

9. A vehicle seatbelt usage indicating device comprising:
a light emitter configured to be engageable to an exterior surface of a door of a vehicle such that the light emitter is affixed thereto, the light emitter being configured for engaging an electronic control unit of the vehicle, such that the light emitter is operationally engaged thereto, such that the electronic control unit is positioned for receiving a signal from a sensor engaged to a buckle of a seatbelt integral to a seat adjacent to the door of the vehicle, such that the sensor is positioned for detecting insertion of a latch into the buckle, such that the electronic control unit is positioned for selectively actuating the light emitter upon insertion of the latch into the buckle for indicating, to a person proximate to the vehicle, proper usage of the seatbelt, the light emitter comprising a housing having a bulb engaged thereto and positioned therein, at least a portion of the housing being substantially transparent, such that light emitted by the bulb passes therethrough, the housing be substantially hemispherically shaped, the portion of the housing comprising a lower quadrant thereof, the bulb comprising a light emitting diode; and the light emitter comprising a set of light emitters, each light emitter being affixable to a respective door of the vehicle, such that each door has a light emitter affixed thereto.

\* \* \* \* \*